C. LE G. FORTESCUE.
SYSTEM OF DISTRIBUTION.
APPLICATION FILED FEB. 7, 1916.

1,357,229.

Patented Nov. 2, 1920.

WITNESSES:
Fred. A. Lind
Geo. W. Hansen

INVENTOR
Charles LeG. Fortescue
BY
Wesley G. Carr
ATTORNEY

UNITED STATES PATENT OFFICE.

CHARLES LE G. FORTESCUE, OF PITTSBURGH, PENNSYLVANIA, ASSIGNOR TO WESTINGHOUSE ELECTRIC AND MANUFACTURING COMPANY, A CORPORATION OF PENNSYLVANIA.

SYSTEM OF DISTRIBUTION.

1,357,229.     Specification of Letters Patent.     Patented Nov. 2, 1920.

Application filed February 7, 1916. Serial No. 76,846.

*To all whom it may concern:*

Be it known that I, CHARLES LE G. FORTESCUE, a subject of the King of Great Britain, and a resident of Pittsburgh, in the county of Allegheny and State of Pennsylvania, have invented a new and useful Improvement in Systems of Distribution, of which the following is a specification.

My invention relates to alternating-current systems of distribution and especially to power systems in which it is desired to maintain constant voltages, irrespective of the load conditions obtaining therein.

More particularly, my invention relates to a system of the above-indicated character which embodies means for automatically compensating for the line-drop resulting from different load conditions, both as regards the power factor, as well as, the value of the load, by compounding the field excitation of the alternator that supplies power to the system. To further extend the application of my invention, I provide means for compounding an alternating-current generator, under the conditions specified, by rectifying an alternating current, the value of which is dependent upon the power-factor and the value of the load current delivered by the generator, and varying the field excitation of said generator by suitably employing this rectified current. It will be understood that the compounding of the field excitation is effected without employing mechanical and other unsatisfactory devices heretofore used for imparting a proper compound characteristic to an alternating-current generator.

In the operation of alternating-current dynamo-electric machines, such, for example, as generators or boosters, it is frequently desirable, for regulating purposes, that the machines be given series or compound operating characteristics. In order to secure such operating characteristics, the field excitation of the machines may be varied in accordance with the load currents.

An object of my invention, therefore, is to accomplish the aforementioned results in an efficient manner without employing devices which have the inherent defects of mechanical rectifying devices. Furthermore, my rectifying means requires very little attention on the part of the operator. Other features of my invention will be disclosed in the following description and pointed out with particularity in the appended claims.

Figure 1:
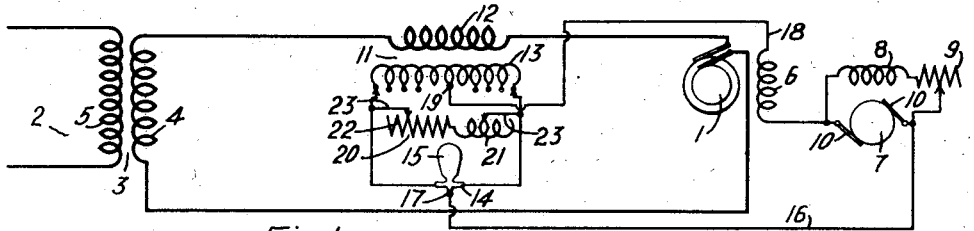
Figure 2:
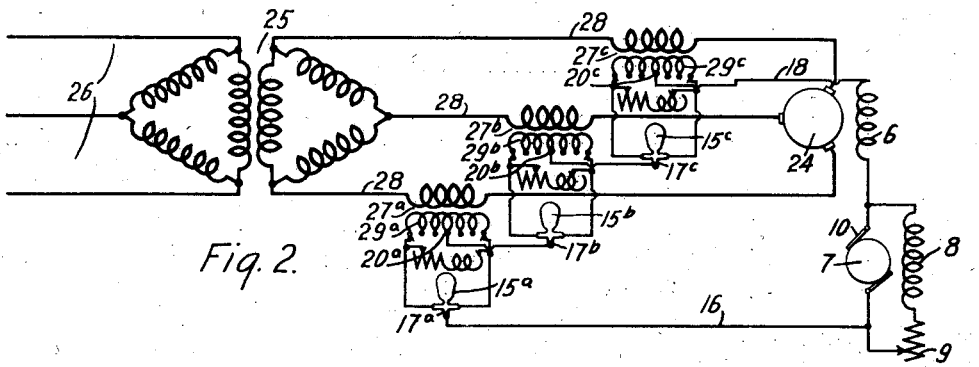
Figure 3:
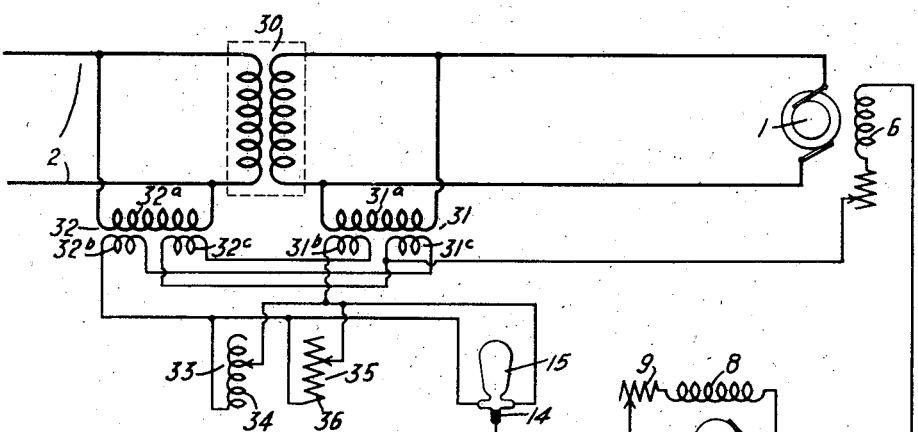

Figure 1 of the accompanying drawing is a diagrammatic view of an alternating-current distributing system comprising an alternator, together with its attendant exciting circuits, embodying a form of my invention; Fig. 2 is a diagrammatic view of a polyphase, alternating-current system, the three-phase alternator of which is compounded in accordance with my invention, and Fig. 3 is an alternating-current distributing system embodying a power transformer and means for compensating for the reactance drop in the transformer as the load conditions in the load circuit vary.

Referring to Fig. 1, a dynamo-electric machine 1, shown as a single-phase alternator, supplies power to a load circuit 2 which is connected through a step-up transformer 3 to the alternator. The transformer 3 comprises a primary winding 4 and a secondary winding 5 and is subject to such conditions as will affect the voltage impressed on the power circuit 2 as the load therein varies. This is a well known characteristic of transformers as well as alternating-current generators because of the varying resistance and reactance drop in a generator and transformer, with varying load conditions. In order to maintain a constant voltage on the distributing circuit 2, irrespective of the load conditions obtaining therein, it is desirable to impart such a characteristic to the alternator 1 as will automatically compensate for the resistance and reactance drop in the line and the associated apparatus, thereby maintaining the impressed voltage at a constant value.

The generator 1 is provided with a field winding 6, the excitation of which, under no load conditions, is furnished by means of a booster 7 adapted to generate a direct current and driven by an independent source of power (not shown). The booster 7 is of the self-exciting type, the field 8 being connected through an adjustable rheostat 9 to the brushes 10. A series transformer 11, comprising a primary winding 12 which is connected in series circuit with the generator 1 and a secondary winding 13 the terminals of which are connected to the cathodes 14 of an asymmetric conductor or mercury rectifier 15, is utilized for furnishing an exciting current to the alternator 1 that is dependent upon the load current supplied thereby. The mercury rectifier 15 is connected to the secondary transformer winding 13 in a usual manner. The circuit for the exciting current, which comprises the field winding 6 and the booster 7, is supplied with direct or rectified current through a lead 16 which is connected to the cathode 17 of the rectifier and a lead 18 which is connected to the mid-point 19 of the transformer winding 13. It is apparent that the electromotive force induced in the secondary winding 13 of the transformer 11 is dependent upon the current flowing through the primary winding 12 and, consequently, the current supplied by the alternator 1. The alternating current flowing in the winding 13, which is therefore dependent upon the load current in the system, is rectified by the rectifier 15 and supplied to effect an increased field excitation for the alternator 1.

To automatically regulate the voltage of the alternator 1 in accordance with certain load conditions, I have supplied the secondary winding 13 of the transformer 11 with a shunt circuit 20 which comprises an adjustable inductive element 21 and an adjustable resistance element 22. The electrical conditions obtaining in the load circuit may be reproduced in miniature in the circuit of the exciting current, when the power-factor in the system remains constant, by properly adjusting the leads 23 of the auxiliary circuit 20. Therefore, the varying reactance and resistance drop of the load circuit may be reproduced in miniature in the circuit of the field winding 6. Moreover, by reason of the auxiliary circuit 20 being connected in shunt to the secondary winding 13, the current flow through the rectifier 15 may be thus regulated to control the voltage of the alternator 1 in accordance with any desired voltage characteristic. Again, the secondary winding 13 is furnished with adjustable taps, thereby providing means for varying the voltage impressed upon the auxiliary circuit 20. In this manner, the voltage of the alternator 1 may be controlled irrespective of the power factor of the load obtaining in the system.

While, with the particular system shown, the regulation of the current conditions for different power factors obtaining in the auxiliary circuit 20 is effected by means of manually moving the adjusting leads 23, and varying the adjustable taps on the secondary winding 13, it will be apparent that other means may be utilized for regulating the adjustable leads 23 in accordance with the load and power-factor conditions obtaining in the load circuit.

In Fig. 2, a three-phase alternator 24 is connected through a three-phase transformer 25 to a three-phase distributing circuit 26. The field excitation for the alternator 24 under no-load conditions is furnished by means of the booster 7 which operates in a manner similar to the booster 7 of Fig. 1. To impart a compound or a series operating characteristic to the alternator 24, the current flow through the field 6 must be varied in accordance with the load currents furnished by the alternator. To accomplish this, series transformers 27 are inserted in each of the mains 28 of the alternator 24. Each secondary winding 29 of the transformers 27 is associated with a current-rectifying device 15 and an auxiliary circuit 20, as explained in connection with a similar arrangement shown in Fig. 1. The rectifiers 15 are, however, connected in series relationship with one another, as indicated, in order to furnish a rectified or direct current to the field winding 6 which depends upon the total load-current supplied by the alternator. The circuit for the exciting current comprising the field winding 6 may be traced through the lead 16, a cathode $17^a$ of a rectifier $15^a$, a mid-point tap $20^a$ of the transformer secondary winding $29^a$, a cathode $17^b$ of a rectifier $15^b$, a mid-point tap $20^b$ of the transformer secondary winding $29^b$, a cathode $17^c$ of a rectifier $15^c$, a mid-point tap $20^c$ of the transformer secondary winding $29^c$ and the lead 18. The three rectifiers $15^a$, $15^b$ and $15^c$ are connected in series relationship in the aforementioned well known manner, and, therefore, the field excitation of the alternator 24 is varied in accordance with the load conditions obtaining in the load circuit 26. Each of the secondary windings of the transformers $27^a$, $27^b$ and $27^c$ is furnished with an auxiliary shunt circuit 20 comprising adjustable resistance and inductive elements, as explained in connection with the system shown in Fig. 1 and for the same purposes.

In Fig. 3, I have shown a system which will automatically compensate for the variations in the voltage impressed on the load circuit 2 which result from the resistance and reactance drop in a power transformer 30 as a result of the varying loads supplied thereby. In this instance, the voltage of the alternator 1 is regulated to automatically compensate for the voltage drop in the transformer 30, the excitation of the field of the generator 7 being controlled directly by the impedance drop in the transformer. For the purpose of illustration only, the transformer 30 may be considered as having unity ratio between the primary turns and the secondary turns. A transformer 31 is associated with the primary side of the transformer 30, and a transformer 32 is associated with the secondary side thereof, the primary windings 31$^a$ and 32$^a$, respectively, being connected in shunt to the primary and the secondary windings of the transformer 30. Each of the secondary windings of the transformers 31 and 32 is shown, for the purpose of illustration, as comprising two coils which are so interconnected that a differential voltage may be impressed across the anodes 14 of the rectifier 15. The secondary winding of the transformer 31 comprises two coils 31$^b$ and 31$^c$, and the secondary winding of the transformer 32 comprises two coils 32$^b$ and 32$^c$, all of said coils being so designed that equal electromotive forces are induced therein. The coils 31$^c$ and 32$^b$ are connected in opposition so that the voltages induced therein are equal and opposite to each other when no-load conditions obtain upon the distributing system, and, similarly, the coils 31$^b$ and 32$^c$ are connected in opposition so that the electromotive forces induced therein are equal and opposite to each other under the same aforesaid conditions. When no-load conditions obtain in the system, the resultant electromotive force impressed across the anodes 14 of the rectifier 15 is zero, since the electromotive forces induced in the aforementioned secondary coils are substantially equal and opposite to one another. When the transformer 30 is loaded, the electromotive forces induced in the secondary coils of the transformers 31 and 32 will vary, inasmuch as a certain voltage drop occurs within the power transformer 30 because of its inherent resistance and reactance. Under this circumstance, the resultant voltage impressed across the anodes 14 of the rectifier 15 will vary in accordance with the voltage drop in the transformer 30, and the rectified current delivered by said rectifier to the field winding 6 of the alternator 1 will vary likewise. A circuit 33, comprising an adjustable inductive element 34 and a circuit 35, comprising an adjustable resistance element 36, are connected in shunt across the terminals of the rectifier 15 in order to regulate the value of the rectified current to compensate for the reactance and resistance drop obtaining under different load conditions in the distributing system. The two circuits 33 and 35, in conjunction, are, in all respects, the electrical equivalent of the shunt circuit 20 of Fig. 1.

While the transformer 30, in this instance, is illustrated as one having unity ratio, it will be understood that any power transformer may be employed for stepping-up or stepping-down the voltage impressed thereupon by the alternator 1. In accordance therewith, the secondary coils of the transformers 31 and 32 must be so designed that, when certain load conditions obtain in the distributing system, the voltages induced therein will be exactly counterbalanced. Any load condition varying from the predetermined one will effect an unbalancing of the voltages induced in the aforementioned secondary windings, thereby varying the voltages impressed across the anodes of the rectifier 15. It will probably be most desirable to counterbalance the voltages induced in the secondary windings when no-load conditions obtain upon the distributing system, as hereinbefore mentioned.

From the foregoing description, it will be apparent that the voltages of an alternator may be regulated in accordance with the load currents delivered without employing any mechanical rectifying devices, the field excitation for imparting the series or compound characteristics to the alternator being regulated through asymmetric conductors, transformers and auxiliary circuits, as indicated.

While I have shown and described several embodiments of my invention, it will be understood that many modifications may be made therein without departing from the spirit and scope of the appended claims.

I claim as my invention:

1. The combination with an alternating-current distributing system, an alternator, and a transformer for interconnecting the alternator and the distributing system, of means dependent upon the voltage drop in said transformer for controlling the field excitation of said alternator.

2. The combination with an alternating-current distributing system, an alternator, and a transformer for interconnecting the alternator and the distributing system, of means dependent upon the variations in the voltage ratios of the primary and secondary sides of said transformer for varying the field excitation of said alternator.

3. The combination with an alternating-current distributing system, an alternator, and a transformer for interconnecting said alternator and the distributing system, of means for obtaining an alternating current having a value that depends upon the reactance drop in the transformer, and additional means for rectifying said alternating current wherewith field excitation of said alternator may be varied.

4. The combination with an alternating-current distributing system, an alternator, and a transformer for interconnecting the alternator and the distributing system, of means dependent upon the voltage-drop in the said transformer for obtaining an alternating current and for rectifying said current, and additional means for varying the amount of the rectified current supplied to the alternator field winding in accordance with the electrical conditions obtaining in the distributing system.

In testimony whereof, I have hereunto subscribed my name this 31st day of Jan., 1916.

CHARLES LE G. FORTESCUE.